(12) United States Patent
Lv et al.

(10) Patent No.: US 9,689,504 B2
(45) Date of Patent: Jun. 27, 2017

(54) ELECTRONIC EXPANSION VALVE AND CONNECTION ASSEMBLY THEREFOR

(71) Applicant: Zhejiang Sanhua Climate and Appliance Controls Group Co., Ltd, Chengguan Town (CN)

(72) Inventors: Ming Lv, Zhejiang Province (CN); Xianrang Wei, Zhejiang Province (CN)

(73) Assignee: Zhejiang Sanhua Climate and Appliance Controls Group Co., Ltd, Chengguan Town (CN)

( * ) Notice: Subject to any disclaimer, the term of this patent is extended or adjusted under 35 U.S.C. 154(b) by 0 days.

(21) Appl. No.: 14/767,682

(22) PCT Filed: Feb. 21, 2014

(86) PCT No.: PCT/CN2014/072357
§ 371 (c)(1),
(2) Date: Aug. 13, 2015

(87) PCT Pub. No.: WO2014/131340
PCT Pub. Date: Sep. 4, 2014

(65) Prior Publication Data
US 2016/0003369 A1    Jan. 7, 2016

(30) Foreign Application Priority Data

Feb. 27, 2013   (CN) .......................... 2013 1 0062164
Feb. 27, 2013   (CN) .......................... 2013 1 0063029

(51) Int. Cl.
*H01R 13/52*     (2006.01)
*F16K 31/04*     (2006.01)
(Continued)

(52) U.S. Cl.
CPC .............. *F16K 31/04* (2013.01); *F16K 27/10* (2013.01); *F25B 41/062* (2013.01);
(Continued)

(58) Field of Classification Search
CPC ... H01R 13/5219; H01R 13/52; H01R 13/627
(Continued)

(56) References Cited

U.S. PATENT DOCUMENTS 3,551,191 A    12/1970   Elbling et al.
3,721,948 A    3/1973    Brandt et al.
(Continued)

FOREIGN PATENT DOCUMENTS

CN    2833931 Y      11/2006
CN    102483175 A    5/2012
(Continued)

OTHER PUBLICATIONS

Japanese Office Action, dated Aug. 30, 2016, from related Japanese Application No. 2015-558338.
(Continued)

*Primary Examiner* — Xuong Chung Trans
(74) *Attorney, Agent, or Firm* — Wolf, Greenfield & Sacks, P.C.

(57) ABSTRACT

An electronic expansion valve and a connector assembly thereof are provided. The connector assembly includes a connector seat hermetically connected to a housing of the electronic expansion valve, and contact pins configured to connect an external control component. The housing has a valve cavity in which an electrical motor is arranged, the connector seat has a sealing cavity in communication with the valve cavity, an insulation sleeve is provided inside the sealing cavity and provided with mounting positions corresponding to terminals of the electrical motor, and the mounting positions are electrically insulated from each other and spaced from each other, the insulation sleeve is further provided with connecting holes, and each contact pin has one end passing through the respective connecting hole to be connected to the respective terminal, and another end (Continued)

extending out of the sealing cavity to form a connecting end to connect the external control component.

16 Claims, 5 Drawing Sheets

(51) Int. Cl.
*F16K 27/10* (2006.01)
*F25B 41/06* (2006.01)

(52) U.S. Cl.
CPC .... *H01R 13/521* (2013.01); *F25B 2341/0653* (2013.01); *Y02B 30/72* (2013.01)

(58) Field of Classification Search
USPC ........................................ 439/587, 271, 283
See application file for complete search history.

(56) References Cited

U.S. PATENT DOCUMENTS

| | | | | |
|---|---|---|---|---|
| 4,461,925 A * | 7/1984 | Bowsky | ............... | H01B 17/305 174/152 GM |
| 4,921,452 A | 5/1990 | Dozier | | |
| 5,364,066 A | 11/1994 | Dorste et al. | | |
| 7,108,489 B2 * | 9/2006 | Yap | ........................ | F01C 21/10 417/410.1 |
| 8,794,999 B2 * | 8/2014 | Schuckmann | ......... | H01R 13/44 439/587 |
| 8,960,637 B2 * | 2/2015 | Parker | ................... | F25B 41/062 251/129.11 |
| 9,383,027 B2 * | 7/2016 | Lv | ........................ | F16K 37/0058 |
| 2002/0092663 A1 | 7/2002 | Gilmour | | |
| 2006/0266329 A1 | 11/2006 | Irihune et al. | | |
| 2007/0178753 A1 | 8/2007 | Mita | | |
| 2008/0096421 A1 | 4/2008 | Hass | | |
| 2009/0014673 A1 | 1/2009 | Weldon et al. | | |
| 2011/0050012 A1 | 3/2011 | Neise et al. | | |
| 2012/0223262 A1 | 9/2012 | Parker et al. | | |
| 2014/0103238 A1 | 4/2014 | Lv et al. | | |

FOREIGN PATENT DOCUMENTS

| | | |
|---|---|---|
| CN | 102853596 A | 1/2013 |
| DE | 1152169 B1 | 8/1963 |
| EP | 0147356 A2 | 7/1985 |
| JP | S48100689 A | 12/1973 |
| JP | S61-006277 U | 1/1986 |
| JP | 2011252538 A | 12/2011 |
| WO | WO 2013/000396 A1 | 1/2013 |

OTHER PUBLICATIONS

International Search Report from corresponding International Application No. PCT/CN2014/072357 dated May 19, 2014.
Extended European Search Report, dated Oct. 13, 2016, from corresponding or related European Application No. 14756803.4.
Chinese First Office Action for Application No. CN 201310062164.2 issued Feb. 24, 2017.

\* cited by examiner

ELECTRONIC EXPANSION VALVE AND CONNECTION ASSEMBLY THEREFOR

The present application is the national phase of International Application No. PCT/CN2014/072357, titled "ELECTRONIC EXPANSION VALVE AND CONNECTION ASSEMBLY THEREFOR", filed on Feb. 21, 2014, which claims the benefit of priorities to Chinese Patent Application No. 201310063029.X titled "ELECTRONIC EXPANSION VALVE AND CONNECTOR ASSEMBLY THEREOF", filed with the Chinese State Intellectual Property Office on Feb. 27, 2013, and Chinese Patent Application No. 201310062164.2 titled "ELECTRONIC EXPANSION VALVE AND CONNECTOR SEAT THEREOF", filed with the Chinese State Intellectual Property Office on Feb. 27, 2013, each of which applications is incorporated herein by reference to the maximum extent allowable by law.

TECHNICAL FIELD

The present application relates to the field of valve body connecting techniques, and particularly to a connector assembly of an electronic expansion valve. The present application further relates to an electronic expansion valve having the connector assembly.

BACKGROUND

With disadvantages of a thermal expansion valve becoming increasingly obvious, an electronic expansion valve is more and more employed in the conventional large refrigerating unit.

Reference is made to FIG. 1, which is a sectional schematic view showing the structure of an electronic expansion valve in an arrangement mode in the conventional technology.

The conventional electronic expansion valve includes a housing 01 and a cover 02, and the cover 02 is screwed to an end portion of the housing 01. The housing 01 is configured to have a hollow structure, and a hollow portion of the housing 01 forms a valve cavity, and an electrical motor 03 is internally arranged in the valve cavity. Lead wires 04 are connected to the electrical motor 03, and each of the lead wires 04 is provided with a terminal 05, the terminal 05 is sleeved on a contact pin 06, and the contact pin 06 is fixed to an insulating plate 08 by sintering glass 07, and the insulating plate 08 is arranged at an end portion of a metal connector seat 09. Generally, the conventional electronic expansion valve includes four terminals 05, and each of the terminals 05 is correspondingly connected to one contact pin 06, and four contact pins 06 are arranged at four corners of a square structure respectively.

Since the mounting space is limited, the four contact pins 06 are spaced from each other by a distance about 4 mm, and the terminal 05 is connected at one end of the respective contact pin 06 where the contact pin is fixed by sintering, that is, one end of the terminal 05 is fixedly arranged, and the maximum distance between the terminals 05 is only about 4 mm. A diameter of the terminal 05 is generally about 2.7 mm, the distance between two adjacent terminals 05 is short, and when the lead wires 04 connected at another ends of the terminals 05 are twisted with each other, adjacent terminals 05 are tend to strike against each other, which further causes short circuit, and adversely affects the normal use of the electrical motor 03.

In addition, the conventional electronic expansion valve has a lot of parts, and the cover 02 and the housing 01 are assembled via threads, thus in a case that a tightening force thereof is not great enough, a risk of refrigerant leakage exists.

Therefore, a technical issue to be addressed by those skilled in the field presently is to design an electronic expansion valve and a connector assembly thereof, to prevent short circuit caused by the terminals striking against each other, thereby improving the connection reliability and ensuring the normal operation.

SUMMARY

An object of the present application is to provide a connector assembly of an electronic expansion valve, which can avoid short circuit caused by terminals striking against each other, and improve the usage safety.

Another object of the present application is to provide an electronic expansion valve having the connector assembly, and the connection reliability of the electronic expansion valve is high.

For addressing the above technical issues, a connector assembly of an electronic expansion valve is provided by the present application, which includes a connector seat hermetically connected to a housing of the electronic expansion valve, and contact pins configured to connect an external control component, and the housing has a valve cavity in which an electrical motor is internally arranged, wherein the connector seat has a sealing cavity in communication with the valve cavity, an insulation sleeve is provided inside the sealing cavity, the insulation sleeve is provided with mounting positions corresponding to terminals of the electrical motor, and the mounting positions are electrically insulated from each other and spaced from each other, the insulation sleeve is further provided with connecting holes configured to allow the contact pins to pass through, and each of the contact pins has one end passing through the respective connecting hole to be connected to the respective terminal, and another end extending out of the sealing cavity to form a connecting end to connect the external control component.

The connector assembly is provided with the insulation sleeve, the insulation sleeve provides the mounting positions corresponding to the terminals, thus the terminals are electrically insulated from each other, thereby preventing the terminals from striking against each other, and avoiding short circuit of the electronic expansion valve caused by the contact of the terminals, and facilitating improving the using effect of the electronic expansion valve. The connector assembly is directly connected to the housing via the connector seat, thus has a simple structure and is easy to assemble.

Preferably, partition plates are provided inside the insulation sleeve and intersect with each other, and the partition plates divide the insulation sleeve into a plurality of the mounting positions.

Preferably, the insulation sleeve is formed integrally by injection molding.

Preferably, the insulation sleeve is directly formed in the connector seat by injection molding.

Preferably, a first groove is provided in an inner wall of the connector seat, and a flange configured to cooperate with the first groove by snap fit is provided on the insulation sleeve.

The insulation sleeve may be snap into the connector seat via the flange, thereby positioning the insulation sleeve by employing such a simple structure, and effectively avoiding the insulation sleeve from slipping with respect to the inner wall of the connector seat.

Preferably, the insulation sleeve is provided with an identification member configured to identify a mounting order of the terminals, to mount the terminals at proper positions, prevent the terminals being mounted out of order, and avoid repair and reassembly, and further, the risk of improper operation is reduced, which ensures the normal operation of the electronic expansion valve.

Preferably, the contact pins are fixedly connected to and electrically insulated from the inner wall of the connector seat by sintering glass.

Preferably, the glass blocks a middle section of the connector seat, to form the sealing cavity and a connecting cavity at two ends of the connector seat respectively, and the connecting cavity is configured to encase the connecting ends of the contact pins.

When the glass is fully filled between the contact pins and the inner wall of the connector seat, good insulation between the contact pins as well as between the contact pins and the connector seat are ensured. At the same time, the glass separates the connector seat into two cavities, wherein the sealing cavity is isolated from the outside to ensure the sealing reliability of the valve cavity and prevent leakage of refrigerant, and the connecting cavity can protect the contact pins, and is used to connect the external control component.

Preferably, the connector assembly further includes a protective jacket sleeved on the connecting ends of the contact pins, and the protective jacket is connected to an inner wall of the connecting cavity in an insulated manner, to improve the usage safety.

An electronic expansion valve is further provided by the present application, which includes a housing having a valve cavity and a connector assembly connected to the housing, and the connector assembly is the connector assembly according to any one of the above solutions.

Since the electronic expansion valve according to the present application has the connector assembly according to any one of the above solutions, the technical effects generated by the connector assembly according to any one of the above solutions may be applied to the electronic expansion valve according to the present application, and will not be described in detail herein.

Preferably, the connector seat is made from a metal material, and the connector seat is connected to the housing by welding. The connector seat and the housing may be formed integrally by welding, which has a high connection reliability and decreases the risk of refrigerant leakage.

Preferably, a guiding section and an assembling section are provided in order on the connector seat at one end connected to the housing, the connector seat is inserted into the housing via the guiding section, and the connector seat is press-fitted with an inner wall of the housing via the assembling section.

The connector seat and the housing may be connected by press fit, to prevent an end portion of the connector seat from being pressed crookedly, and the guiding section may be provided at a head end of the connector seat, to facilitate assembly. The assembling section fits closely with an end surface of the housing, which helps decrease defective goods caused by poor welding, and improves the finished product ratio.

Preferably, a welding position is formed at connecting end surfaces of the assembling section and the housing, and the welding position is spaced from the mounting position of the glass by a predetermined distance.

Since a lot of heat may be generated during the welding, the heat may adversely affect the strength and insulation property of the glass. By arranging the predetermined distance, the affect of welding on the glass is decreased, thereby ensuring the insulation property between the contact pins and the insulation property between the contact pins and the inner wall of the connector seat.

Preferably, a second groove is provided between the welding position and the glass, and the second groove is configured to prevent heat generated in a welding process from diffusing towards the glass, to further reduce the affect of the heat on the insulation property of the glass.

DETAILED DESCRIPTION

A core of the present application is to provide a connector assembly of an electronic expansion valve, which can prevent adjacent terminals from coming into contact with each other and striking against each other, to further avoid short circuit.

Another core of the present application is to provide an electronic expansion valve having the connector assembly, which has a high connection reliability and can be safely and conveniently used.

For those skilled in the art to better understand technical solutions of the present application, the present application is described in detail in conjunction with drawings and embodiments hereinafter.

Figure 1:
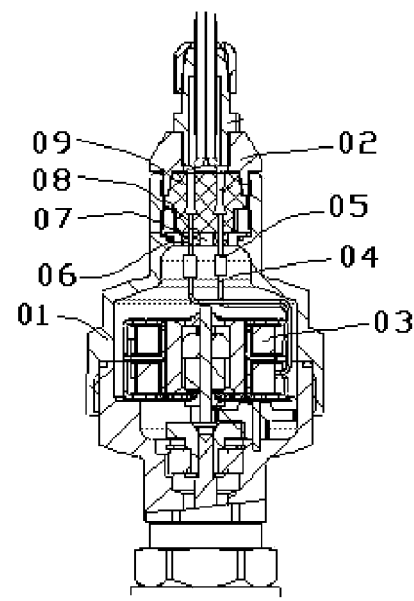
FIG. 1 is a sectional schematic view showing the structure of an electronic expansion valve in an arrangement mode in the conventional technology.
Figure 2:
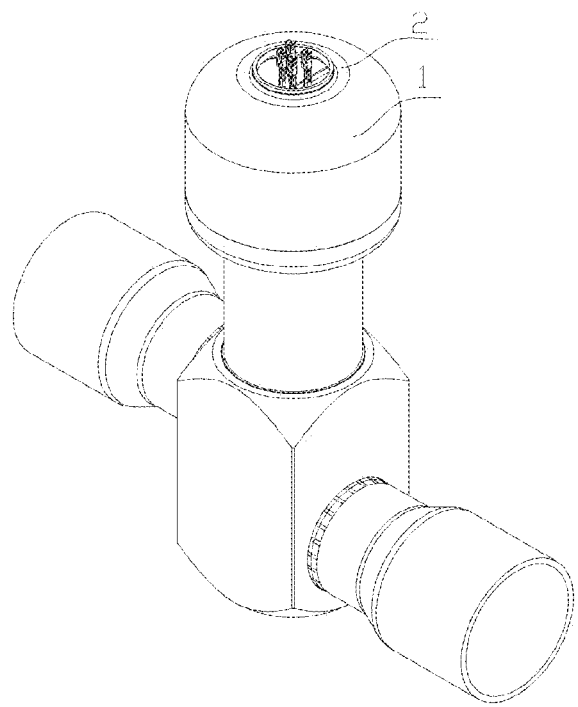
FIG. 2 is a perspective schematic view showing the structure of an electronic expansion valve according to an embodiment of the present application.
Figure 3:
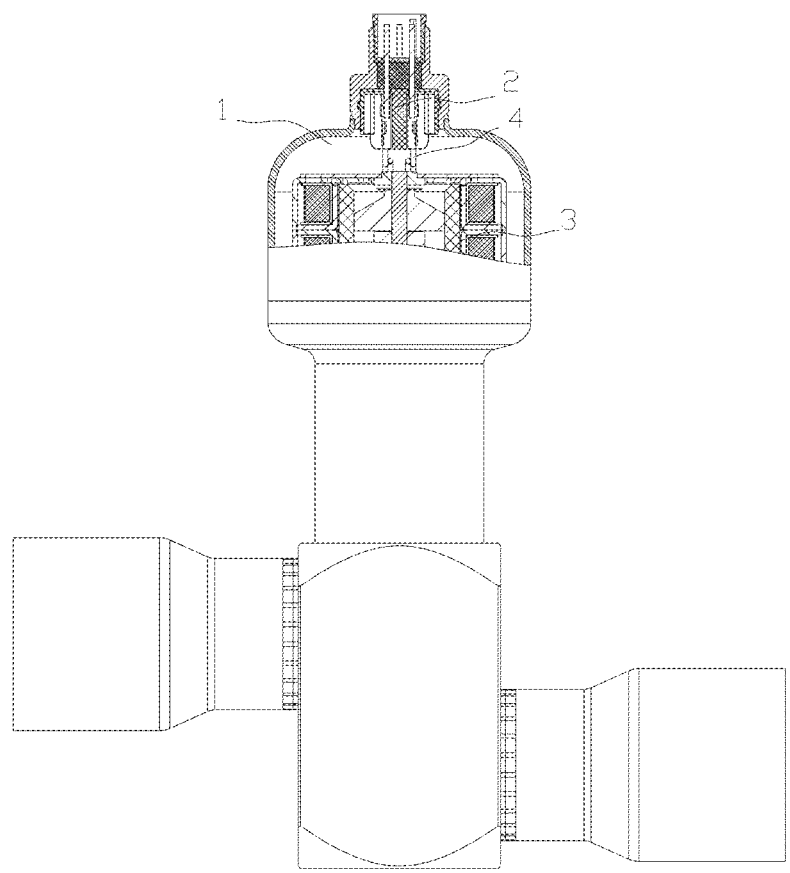
FIG. 3 is a partially sectional view showing a front structure of the electronic expansion valve in FIG. 2.

Reference is made to FIGS. 2 and 3, wherein FIG. 2 is a perspective schematic view showing the structure of an electronic expansion valve according to an embodiment of the present application, and FIG. 3 is a partially sectional view showing a front structure of the electronic expansion valve in FIG. 2.

In an embodiment, an electronic expansion valve according to the present application includes a housing 1 having a valve cavity and a connector assembly 2 connected to the housing 1, an electrical motor 3 is internally arranged in the valve cavity of the housing 1, and terminals 4 are connected to the electrical motor 3. The terminals 4 are connected to an external control component via the connector assembly 2, thus the electrical motor 3 can be controlled by the external control component, to further control the whole electronic expansion valve.

The housing 1 and the connector assembly 2 can be connected by welding, the welding connection has a good sealing performance, thus refrigerant in the valve cavity can be prevented from leaking, and the using effect is great. The housing 1 and the connector assembly 2 may also be connected by wedging, riveting, threaded connection, and etc.

Figure 4:
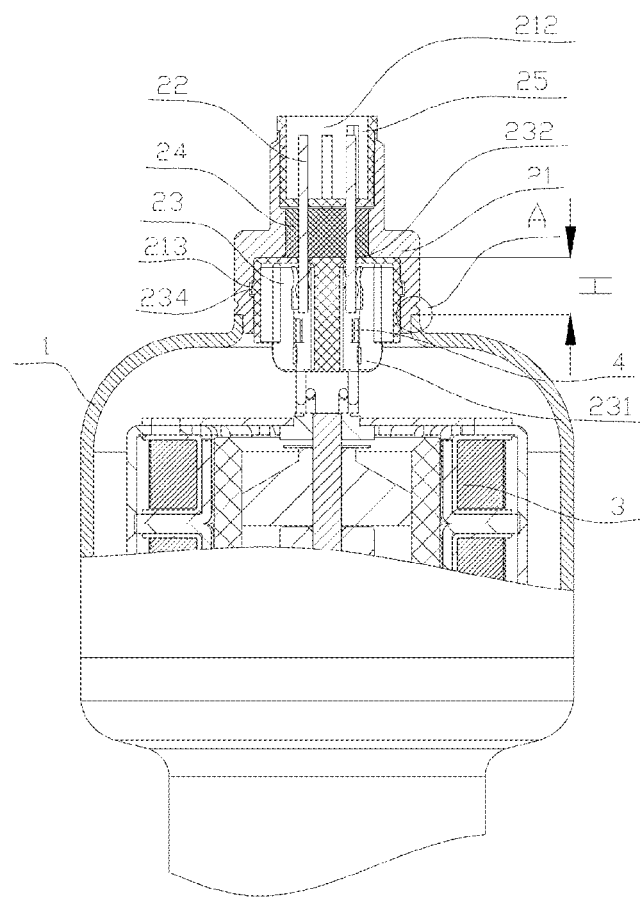
FIG. 4 is a partially enlarged schematic view of a head end of the electronic expansion valve in FIG. 3.
Figure 5:
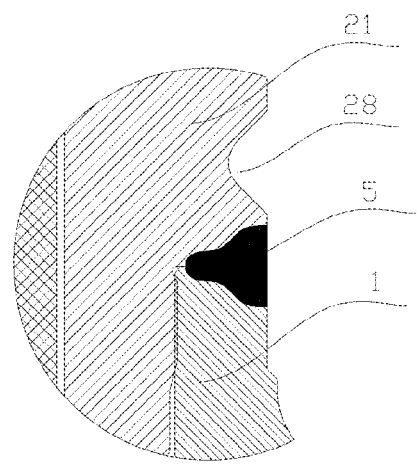
FIG. 5 is a partially enlarged schematic view showing portion A in FIG. 4.

Reference is made to FIGS. 4 and 5, wherein FIG. 4 is a partially enlarged schematic view of a head end of the electronic expansion valve in FIG. 3, and FIG. 5 is a partially enlarged schematic view showing portion A in FIG. 4.

The connector assembly 2 according to the present application includes a connector seat 21 and contact pins 22, one end of the connector seat 21 has a sealing cavity 211, and the sealing cavity 211 is in communication with the valve cavity of the housing 1, and an insulation sleeve 23 is arranged in the sealing cavity 211. The insulation sleeve 23 has mounting positions 231 arranged corresponding to the terminals 4, and the mounting positions 231 are electrically insulated from each other and spaced from each other. The insulation sleeve 23 is also provided with connecting holes 232, and one end of each of the contact pins 22 passes through the respective connecting hole 232 to be connected to the respective terminal 4, and another end of each of the contact pins 22 extends out of the sealing cavity 211 to form a connecting end, and the connecting end is configured to be connected to the external control component.

The connector assembly 2 is provided with the insulation sleeve 23, and the insulation sleeve 23 is provided with the mounting positions 231 electrically insulated from each other, thus the terminals 4 can be mounted in the mounting positions 231 correspondingly, and the terminals 4 are electrically insulated from each other, thereby avoiding short circuit caused by the terminals 4 striking against each other and ensuring the normal use of the electronic expansion valve. The connector seat 21 is hermetically connected to the housing 1, and is connected to the outside via the contact pins 22, thus the connector seat 21 has a good sealing performance and a simple structure.

For fixing the contact pins 22, glass 24 may be filled in clearances between the contact pins 22, and then the contact pins 22 are fixed to the connector seat 21 by sintering the glass 24, thus the contact pins 22 are fixed, and the contact pins 22 are electrically insulated from each other by the glass 24, and the contact pins 22 are electrically insulated from an inner wall of the connector seat 21 by the glass 24. A plurality of contact pins 22 are fixed by sintering one whole piece of glass 24, spaces between the contact pins 22 can be relatively decreased to realize the compact arrangement of the contact pins 22, thus the spaces between the contact pins 22 and the inner wall of the connector seat 21 can be increased, to improve the insulation properties between the contact pins 22 and the inner wall of the connector seat 21.

The glass 24 may also block a middle section of the connector seat 21, thus a sealing cavity 211 and a connecting cavity 212 are formed at two ends of the connector seat 21 respectively, and the contact pins 22 are encased in the connecting cavity 212, and the connecting cavity 212 is configured to connect the external control component. The glass 24 isolates the sealing cavity 211 from the outside, to seal the sealing cavity 211. The glass 24 is arranged at one end of the contact pin 22 where the contact pin 22 extends out of the connecting hole 232, and herein, since the glass 24 can seal the clearance between the connecting hole 232 and the contact pin 22, the insulation sleeve 23 is isolated from the outside, which further ensure the sealing performance of the sealing cavity 211, and reduces the risk of refrigerant leakage.

It should be noted that, the middle section of the connector seat 21 doesn't definitely refer to a central position, and the middle section refers to a distance extending from a central position of the connector seat 21 to two ends thereof.

The contact pins 22 can be insulated and fixed by other ways, for example, a fixing sleeve may be sleeved on each of the contact pins 22 and the fixing sleeve is made from insulating material.

Besides, the insulation sleeve 23 can be isolated from the outside by arranging an isolation pad or one layer of sealing film on the exterior of the insulation sleeve 23, thus the insulation sleeve 23 is isolated from the outside. Or, a sealing material or a gasket may be provided in each of the clearance between the insulation sleeve 23 and the connector seat 21 and the clearance between the connecting hole 232 and the contact pin 22, thus the insulation sleeve 23 is configured as a sealing assembly, to ensure the sealing performance of the sealing cavity 211.

As shown in FIG. 5, the connector assembly 2 may be welded to the housing 1 via the connector seat 21, the connector seat 21 may be made from metal material, and an end portion of the connector seat 21 is welded to the housing 1. The welding connection is relatively stable, and has a high connection reliability.

At the same time, the welding portion is required to be spaced from the position where the glass 24 is arranged by a predetermined distance H, to prevent heat generated by welding from adversely affecting the performance of the glass 24, and the heating generated by the welding may decrease the insulating property and strength of the glass 24. Since the glass 24 and a welding port of the connector seat 21 are not in the same plane, a distance between the glass 24 and the welding port of the connector seat 21 in the horizontal direction has little effect on the glass 24, therefore the predetermined distance H mainly refers to a distance between the glass 24 and the welding port of the connector seat 21 in an axial direction of the connector seat 21. The predetermined distance H generally should be greater than 2 mm, to enable the welding portion of the connector seat 21 and the housing 1 to be away from the glass 24, thereby decreasing adverse affect on the strength and insulating property of the glass 24 caused by the welding heat. Of course, the predetermined distance H may also be adjusted according to the specification of the connector seat 21.

Figure 6:
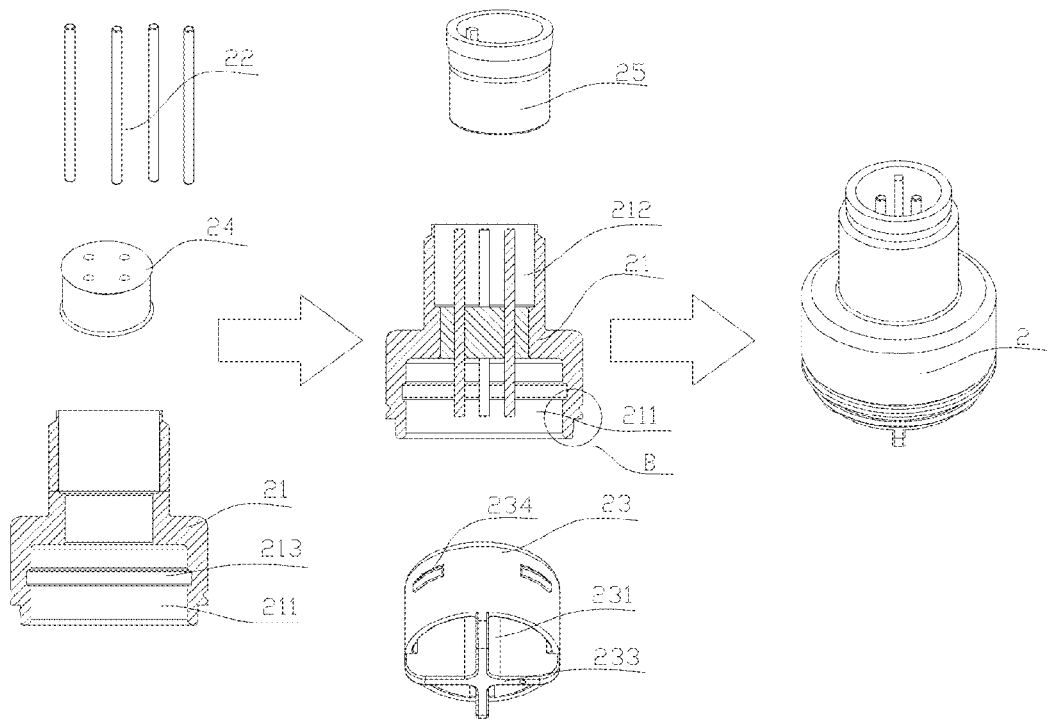
FIG. 6 is a schematic view showing the assembling process of a connector assembly in an arranging manner according to the present application.
Figure 7:
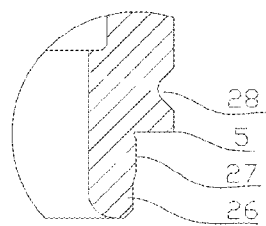
FIG. 7 is a partially enlarged schematic view showing portion B in FIG. 6.
Figure 8:
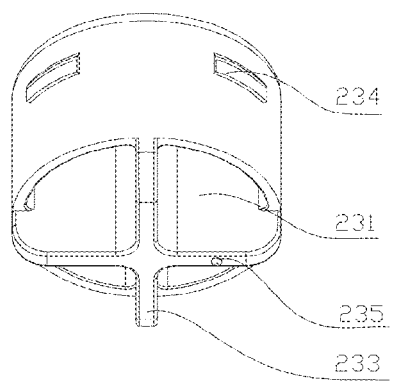
FIG. 8 is a perspective schematic view showing the structure of an insulation sleeve in an arranging manner according to the present application.
Figure 9:
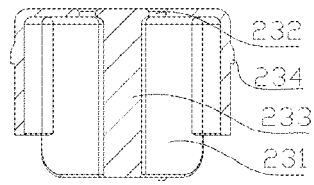
FIG. 9 is a sectional view of the insulation sleeve in FIG. 8.
Figure 10:
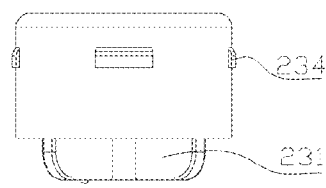
FIG. 10 is a front view of the insulation sleeve in FIG. 8.
Figure 11:
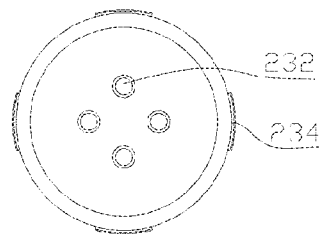
FIG. 11 is a top view of the insulation sleeve in FIG. 8.

Reference is made to FIGS. 6 to 11, wherein FIG. 6 is a schematic view showing the assembling process of the connector assembly in an arranging manner according to the present application, FIG. 7 is a partially enlarged schematic view showing portion B in FIG. 6, FIG. 8 is a perspective schematic view showing the structure of an insulation sleeve in an arranging manner according to the present application, FIG. 9 is a sectional view of the insulation sleeve in FIG. 8, FIG. 10 is a front view of the insulation sleeve in FIG. 8, and FIG. 11 is a top view of the insulation sleeve in FIG. 8.

The insulation sleeve 23 may be provided with partition plates 233, and the partition plates 233 intersect with each other, to divide the insulation sleeve 23 into a plurality of mounting positions 231. The mounting positions 231 are arranged corresponding to the terminals 4, generally the number of the terminals 4 is four, and accordingly two of the partition plates 233 are provided, and the two partition plates 233 are intersected by a certain angle to form four mounting positions 231. Accordingly, the insulation sleeve 23 may be provided with four connecting holes 232, and as shown in FIGS. 6 and 11, the connecting holes 232 may be symmetrically distributed. Of course, the partition plates 233 may also be arranged separated from each other, the number and the mounting position of the terminals 4 may be adjusted according to the requirements. The partition plates 233 may be detachably connected in the insulation sleeve 23, and in this way, the positions of the partition plates 233 can be changed or adjusted according to the requirements. For example, the partition plates 233 may be embodied as inserting plates connected to each other, the inserting plates can be inserted into one another and separated from one another, thereby changing the positions of the inserting plates and replacing the inserting plates. Obviously, employing the partition plates 233 intersected with each other is only one kind of manners for arranging the mounting positions 231, and sleeves separated from each other may be arranged to form the mounting positions 231, or snap rings may be provided inside the insulation sleeve 23, and the snap rings are clasped to each other and insulated from each other, to form the mounting positions 231.

There are various manners for connecting the insulation sleeve 23 to the connector seat 21, for example, a first groove 213 may be provided in an inner wall of the connector seat 21, a flange 234 is provided on an outer wall of the insulation sleeve 23, and the flange 234 is adaptively snapped into the first groove 213, to fixedly connect the insulation sleeve 23 to the connector seat 21. The flange 234 can be pressed into the first groove 213, which has a high connection reliability, and a good effect of disengagement prevention. The insulation sleeve 23 and the connector seat 21 may also be connected by riveting, or the insulation sleeve 23 and the connector seat 21 are fixed by gluing, or the insulation sleeve 23 may be screwed to the inner wall of the connector seat 21.

The insulation sleeve 23 may be formed integrally by injection molding.

Moreover, the insulation sleeve 23 may be directly formed in the connector seat 21 by injection molding, that is, the connector seat 211 is put into a mold to perform injection molding, to form the insulation sleeve 23 having partition plates 233 in the connector seat 21, and with such structure, the insulation sleeve 23 and the connector seat 21 can be fixed more solidly.

The connector assembly 2 may further include a protective jacket 25, and the protective jacket 25 is sleeved on the connecting ends of the contact pins 22 and is connected to the inner wall of the connecting cavity 212 in an insulated manner. The protective jacket 25 may protect the contact pins 22, to guarantee the insulation property between the contact pins 22 and the connector seat 21. The protective jacket 25 may be configured to cooperate with a connecting end of the external control component, in this way, when the external control component is connected into the protective jacket 25, the contact pins 22 are inserted into the external control component, thereby insulating the external control component from the connector seat 21 and improving the usage safety.

In addition, the insulation sleeve 23 may be provided with an identification member 235, the identification member 235 can identify the mounting order of the terminals 4, to ensure that the terminals 4 are mounted into the corresponding mounting positions, to guarantee the accuracy of mounting and prevent the terminals 4 from being improperly inserted into the mounting positions.

The connector seat 21 may be further provided with a guiding section 26 and an assembling section 27 at one end connected to the housing 1, and the guiding section 26 and the assembling section 27 are arranged in order from a head end of the connector seat 21, as shown in FIG. 7. In installing, the connector seat 21 is inserted into the housing 1 via the guiding section 26, and then the assembling section 27 of the connector seat 21 is press-fitted with the inner wall of the housing 1, as shown in FIG. 4.

It should be understood that, a head end of the guiding section 26 may be provided with a chamfering, to allow the guiding section 26 to be smoothly inserted into the housing 1, or an outer wall of the guiding section 26 is inclined by a certain angle. The press fit between the assembling section 27 and the housing 1 may be an interference fit, to ensure the reliability of connection between the assembling section 27 and the housing 1.

Besides, the guiding section 26 and the assembling section 27 may be adjacently arranged, the guiding section 26 mainly functions to guide and facilitate assembling, and the assembling section 27 is configured to ensure the reliability of connection between the connector seat 21 and the housing 1.

After the above assembly is completed, connecting end surfaces of the assembling section 27 and the housing 1 form a welding position 5, and the connector seat 21 and the housing 1 are welded at the welding position 5, as shown in FIG. 5. A distance between the welding position 5 and the glass 24 in the axial direction of the connector seat 21 is the distance H.

It is more preferred that, the connector seat 21 according to the present application is further provided with a second groove 28 between the welding position 5 and the glass 24, and the second groove 28 is configured to prevent heat generated in the welding process from diffusing toward the glass 24.

As shown in FIGS. 5 and 7, an outer wall of the connector seat 21 is sunken inward to form the second groove 28, and the second groove 28 is configured to have an arc shape, and the second groove 28 is generally arranged adjacent to the welding position 5. With the second groove 28, a certain space for diffusing the heat generated in the welding process is provided, which helps the heat diffuse into the air, to reduce the welding heat absorbed by the connector seat 21 as much as possible, thereby reducing the heat transferred into the glass 24 via the connector seat 21, and reducing the effect of welding heat on the insulation property of the glass 24.

It should be understood that, the shape of the second groove 28 is not limited to the arc shape, and the second groove 28 may not be arranged adjacent to the welding position 5, and may be not necessarily arranged on the outer wall of the connector seat 21. In theory, the second groove 28 may be arranged at any position in a transferring path of the welding heat towards the glass 24. It should be understood by those skilled in the field that, the effect of preventing the welding heat from diffusing is better in the case that the second groove 28 is arranged in the connector seat 21 at the position adjacent to the welding position 5.

An electronic expansion valve and the connector assembly thereof according to the present application are described in detail hereinbefore. The principle and the embodiments of the present application are illustrated herein by specific examples. The above description of examples is only intended to help the understanding of the core idea of the present application.

It should be noted that, for the person skilled in the art, a few of improvements and modifications may be made to the present application without departing from the principle of the present application, and these improvements and modifications are also deemed to fall into the scope of the present application defined by the claims.

The invention claimed is:

1. A connector assembly of an electronic expansion valve, comprising a connector seat hermetically connected to a housing of the electronic expansion valve, and contact pins configured to connect an external control component, and the housing having a valve cavity in which an electrical motor is internally arranged, wherein, the connector seat has a sealing cavity in communication with the valve cavity, an insulation sleeve is provided inside the sealing cavity, the insulation sleeve is provided with mounting positions corresponding to terminals of the electrical motor, and the mounting positions are electrically insulated from each other and spaced from each other, the insulation sleeve is further provided with connecting holes configured to allow the contact pins to pass through, and each of the contact pins has one end passing through the respective connecting hole to be connected to the respective terminal, and another end extending out of the sealing cavity to form a connecting end to connect the external control component, wherein a first groove is provided in an inner wall of the connector seat, and a flange configured to cooperate with the first groove by snap fit is provided on the insulation sleeve, wherein the connector assembly further comprises a protective jacket sleeved on the connecting ends of the contact pins, and the protective jacket is connected to an inner wall of the connecting cavity in an insulated manner.

2. The connector assembly according to claim 1, wherein partition plates are provided inside the insulation sleeve and intersect with each other, and the partition plates divide the insulation sleeve into a plurality of the mounting positions.

3. The connector assembly according to claim 2, wherein the insulation sleeve is formed integrally by injection molding.

4. The connector assembly according to claim 3, wherein the insulation sleeve is directly formed in the connector seat by injection molding.

5. The connector assembly according to claim 1, wherein the insulation sleeve is provided with an identification member configured to identify a mounting order of the terminals.

6. The connector assembly according to claim 1, wherein the contact pins are fixedly connected to and electrically insulated from the inner wall of the connector seat by sintering glass.

7. The connector assembly according to claim 6, wherein the glass blocks a middle section of the connector seat, to form the sealing cavity and a connecting cavity at two ends of the connector seat respectively, and the connecting cavity is configured to encase the connecting ends of the contact pins.

8. The connector assembly according to claim 2, wherein the contact pins are fixedly connected to and electrically insulated from the inner wall of the connector seat by sintering glass.

9. The connector assembly according to claim 5, wherein the contact pins are fixedly connected to and electrically insulated from the inner wall of the connector seat by sintering glass.

10. An electronic expansion valve, comprising a housing having a valve cavity and a connector assembly connected to the housing, wherein the connector assembly comprises a connector seat hermetically connected to the housing of the electronic expansion valve, and contact pins configured to connect an external control component, and an electrical motor is internally arranged in the valve cavity of the housing, wherein, the connector seat has a sealing cavity in communication with the valve cavity, an insulation sleeve is provided inside the sealing cavity, the insulation sleeve is provided with mounting positions corresponding to terminals of the electrical motor, and the mounting positions are electrically insulated from each other and spaced from each other, the insulation sleeve is further provided with connecting holes configured to allow the contact pins to pass through, and each of the contact pins has one end passing through the respective connecting hole to be connected to the respective terminal, and another end extending out of the sealing cavity to form a connecting end to connect the external control component, wherein a first groove is provided in an inner wall of the connector seat, and a flange configured to cooperate with the first groove by snap fit is provided on the insulation sleeve, wherein the connector assembly further comprises a protective jacket sleeved on the connecting ends of the contact pins, and the protective jacket is connected to an inner wall of the connecting cavity in an insulated manner.

11. The electronic expansion valve according to claim 10, wherein the connector seat is made from a metal material, and the connector seat is connected to the housing by welding.

12. The electronic expansion valve according to claim 11, wherein a guiding section and an assembling section are provided in order on the connector seat at one end connected to the housing, the connector seat is inserted into the housing via the guiding section, and the connector seat is press-fitted with an inner wall of the housing via the assembling section.

13. The electronic expansion valve according to claim 12, wherein a welding position is formed at connecting end surfaces of the assembling section and the housing, and the welding position is spaced from the mounting position of glass by a predetermined distance.

14. The electronic expansion valve according to claim 13, wherein a second groove is provided between the welding position and the glass, and the second groove is configured to prevent heat generated in a welding process from diffusing towards the glass.

15. The electronic expansion valve according to claim 10, wherein partition plates are provided inside the insulation sleeve and intersect with each other, and the partition plates divide the insulation sleeve into a plurality of the mounting positions.

16. The electronic expansion valve according to claim 10, wherein the contact pins are fixedly connected to and electrically insulated from the inner wall of the connector seat by sintering glass.

* * * * *